United States Patent Office 3,148,195
Patented Sept. 8, 1964

3,148,195
PRODUCTION OF AMINO-ETHYL-CARBAZOLE BY CATALYTIC HYDROGENATION
David E. Graham and Eugen V. Hort, Westfield, Lawrence D. Lytle, Plainfield, and James B. Normington, Monmouth, N.J., assignors to General Aniline & Film Corporation, New York, N.Y., a corporation of Delaware
No Drawing. Filed Mar. 31, 1960, Ser. No. 18,891
6 Claims. (Cl. 260—315)

This invention relates to an improved method for the production of 3-amino-N-ethyl-carbazole by the catalytic reduction of 3-nitro-N-ethyl-carbazole.

3-amino-N-ethyl-carbazole is an intermediate employed for the manufacture of pigments and dyestuffs of the dioxazine series, particularly Pigment Fast Violet R Base and Sirius Supra Blue FFRL by series of reactions as described and formulated in volume 2 of the "Chemistry of Synthetic Dyes" by K. Venkataraman, Academic Press Inc., New York 1952, pages 786–8.

As described by Venkataraman and further described in PB Report 73849, pages 2036 and 2037, Reel A–24, one method for making 3-amino-N-ethyl-carbazole is by reduction of the corresponding nitro compound with sodium sulfide in boiling ethyl alcohol. The product is isolated by cooling, filtering from the mother liquor and working with alcohol. A yield of 94–97% of theory can be obtained by repeated reuse of the alcohol mother liquors. It has been our experience, however, that the quality of the product becomes unsatisfactory for making Pigment Fast Violet R Base when the mother liquor is reused. This process also suffers from the disadvantage that it involves the handling of boiling ethanol with its hazards and inevitable solvent losses in commercial operation. It also suffers from the disadvantage that the amine needs to be isolated for further use.

In order to avoid some of the difficulties inherent in reduction using sodium sulfide in boiling alcohol, we have also heretofore resorted to an expensive zinc and sulfuric acid reduction. While products of satisfactory quality are obtained by this process, the product is isolated as the acid sulfate which still needs another step to convert it to the free amine before it can be reacted with chloranil.

A simple and economic process for the production of 3-amino-N-ethyl-carbazole from the corresponding nitro compound would appear to be catalytic hydrogenation. In fact such catalytic hydrogenation has previously been suggested; see for example BIOS Final Report #960, page 74 which states that in Germany 3-nitro-N-ethyl-carbazole had been "Formerly reduced with hydrogen using a nickel catalyst, but the method was discontinued as the nickel could not be completely removed and had a bad effect on the later operations."

We have now found that by proper selection of catalyst and other conditions of reaction, 3-nitro-N-ethyl-carbazole can be catalytically hydrogenated to 3-amino-N-ethyl carbazole in an economic manner and with improved overall yields. A further and unexpected advantage of the present process is that we are able to employ, as solvent in the catalytic hydrogenation, chlorinated aromatic hydrocarbons, and particularly dichlorobenzene which as stated by Venkataraman (op. cit.) is a preferred solvent for use during the conversion of the amine to the pigment. Thus when operating in accordance with the present invention, there is no need to isolate the 3-amino-N-ethyl-carbazole from the solvent in which it is produced in order to use it for the production of Pigment Fast Violet R Base. It is unexpected that dichlorobenzene can be employed as the solvent in the catalytic reduction of 3-nitro-N-ethyl-carbazole since it is well known that chlorine can be hydrogenolyzed in dichlorobenzene producing hydrogen chloride which will react with or poison the catalyst as well as destroying the solvent. In fact, this does occur unless specific conditions and catalyst are used.

In brief, the process of the present invention involves the catalytic reduction of 3-nitro-N-ethyl-carbazole employing relatively mild conditions of temperature and pressure, and importantly employing a supported nickel catalyst having a nickel content of not over 75% by weight which is relatively less active than a skeletal type of nickel catalyst. We have found that if an active skeletal type of nickel catalyst such as a sponge nickel or Raney nickel is employed, even under the other conditions of temperature or pressure, when chlorinated aromatic solvents are employed in the present reaction, that undesirable side reactions such as production of hydrogen chloride are promoted. However, we have found that with a less active supported nickel catalyst such as nickel on kieselguhr, this side reaction is essentially eliminated under the conditions employed in practicing the present invention. A small amount of acid acceptor (a weak alkali, such as sodium acetate) may be present during the reduction according to the present invention to neutralize any traces of acid formed and thus further prevent reaction of the HCl with the catalyst. While the full range of operating conditions has not been critically established, the following ranges have been found to be satisfactory in the present process.

The reduction is preferably carried out at a temperature of about 100° C. (i.e. 50–125° C.) and under a hydrogen pressure of from 50–300 p.s.i.g. A catalyst concentration of 4–10 parts by weight per 200 parts of 3-nitro-N-ethyl-carbazole charge is preferred when the nickel content of the catalyst is about 50–60% concentration. The concentration of 3-nitro-N-ethyl-carbazole in solvent, dichlorobenzene, is preferably about 1 part of nitro compound to 3 parts by weight of solvent. It has been found, however, that lower concentrations of the nitro compound in the solvent will be equally operative, although they are less economical. Also higher concentrations of nitro compound in solvent are operative, although such higher concentrations may require somewhat higher filtration temperatures to separate the catalyst from the amino compound. However, since about 1 part by weight of nitro compound to 3 parts by weight of solvent gives a concentration of the amino compound in solvent which is at a preferred concentration for further processing into Pigment Fast Violet R Base, higher concentrations are not necessary. While we particularly prefer to employ orthodichlorobenzene or commercial mixtures of ortho and paradichlorobenzene as the solvent, other chlorinated aromatic hydrocarbon solvents have also been found suitable for this hydrogenation. Suitable chlorinated aromatic hydrocarbon solvents for use in practicing the present invention include not only ortho-dichlorobenzene and para-dichlorobenzene and mixtures thereof, but also monochlorobenzene, ortho-, meta-, and parachlorotoluene and mixtures thereof, particular mixed ortho- and meta-chlorotoluene, monochlor-p-xylene, nonochlor-m-xylene, and 2,5-dichlor-p-xylene.

The details of the present invention will be apparent from the following specific examples in which all parts are by weight.

*Example 1*

192 parts of 3-nitro-N-ethyl-carbazole was dissolved in 600 parts of ortho-dichlorobenzene. 10 parts of a commercial nickel on kieselguhr catalyst containing ca. 60% of nickel (Girdler G 49), and 10 parts of anhydrous sodium acetate were added.

The hydrogenation was carried out in a rocking autoclave at 100 p.s.i.g. hydrogen pressure and 100° C. The theoretical hydrogen was taken up in 2.3 hours at which time absorption of hydrogen ceased. The hydrogenation mixture was filtered at 50° C. to remove catalyst and the catalyst washed 5 times with 100 parts of ortho-dichlorobenzene. The combined filtrate and washes were used directly without further isolation of the 3-amino-N-ethyl-carbazole formed, in a condensation reaction with chloranil followed by a ring closure in the same reaction medium to form Pigment Fast Violet R Base.

The overall yield of Pigment Fast Violet R Base from 3-nitro-N-ethyl-carbazole was 68.3% of theory. This compares with the 62.5% of theory yield obtained by the cumbersome and expensive sodium sulfide method. Further the product was of excellent quality as indicated by tinctorial strength and fastness properties.

*Example 2*

This was the same as Example 1 except that the operating pressure was reduced to 75 p.s.i.g. instead of 100 p.s.i.g. and only 8 parts of the same catalyst described in Example 1 was used instead of 10 parts. The hydrogenation time was 4 hours.

The yield and quality of the Pigment Fast Violet R Base was exactly the same as in Example 1.

*Example 3*

This was the same as Example 1 except only 8 parts of the same catalyst was used.

The yield of Pigment Fast Violet R Base was 73.2% of theory as compared with 62.5% for the sulfide method. This is a 19% increase in yield over the cumbersome old method. The quality was also excellent as indicated by tinctorial strength and fastness properties.

*Example 4*

This was the same as Example 1 in general using 384 parts of 3-nitro-N-ethyl-carbazole, 1,100 parts of a commercial ortho-dichlorobenzene containing ca. 20% para-dichlorobenzene, 20 parts anhydrous sodium acetate and only 10 parts of a similar catalyst to that of Example 1 but containing 50% nickel. The hydrogenation time was 8 hours. The yield and quality of the Pigment Fast Violet R base were exactly the same as in Example 1 (68.3% of theory).

*Example 5*

This is the same as Example 1 except that the solvent used was the commercial mixture of ortho- and para-chlorotoluenes. The catalyst was a reduced nickel on alumina containing 25% metallic nickel. Results were similar to those obtained in Example 1.

We claim:
1. Process for the production of 3-amino-N-ethyl-carbazole by the catalytic reduction of 3-nitro-N-ethyl-carbazole which comprises dissolving 3-nitro-N-ethyl-carbazole in a chlorinated aromatic hydrocarbon solvent and subjecting the same to the action of hydrogen in the presence of a small amount of a hydrogenation catalyst consisting essentially of nickel on an inert carrier.
2. A process as defined in claim 1 wherein the solvent employed is a dichlorobenzene solvent.
3. A process as defined in claim 2 wherein the solvent employed is ortho-dichlorobenzene.
4. A process for the production of 3-amino-N-ethyl-carbazole by the catalytic reduction of 3-nitro-N-ethyl-carbazole which comprises dissolving 3-nitro-N-ethyl-carbazole in a chlorinated aromatic hydrocarbon solvent and subjecting the same to the action of hydrogen at a temperature of about 50–125° C. and a pressure of about 50–300 p.s.i.g. in the presence of a small amount of a hydrogenation catalyst consisting essentially of nickel on an inert carrier.
5. A process as defined in claim 4 wherein the chlorinated aromatic solvent specified is a dichlorobenzene solvent.
6. A process as defined in claim 4 wherein the chlorinated aromatic solvent specified is ortho-dichlorobenzene.

References Cited in the file of this patent

FOREIGN PATENTS 7,882   Great Britain _____ Sept. 26, 1913

OTHER REFERENCES

MacArdle: Solvents in Organic Chemistry, pp. 135–6 (Van Nostrand, 1925).
Adkins: Reactions of Hydrogen, pp. 12–17 (U. of Wis., 1937).
Chemical Reviews, vol. 40, p. 369, 1947.
Fieser and Fieser, Organic Chemistry, 3rd edition, p. 649, Reinhold, 1956.
BIOS, Final Report, #960, p. 74.

UNITED STATES PATENT OFFICE
CERTIFICATE OF CORRECTION

Patent No. 3,148,195                                       September 8, 1964

David E. Graham et al.

It is hereby certified that error appears in the above numbered patent requiring correction and that the said Letters Patent should read as corrected below.

In the grant, line 1, and in the heading to the printed specification, line 4, for "Eugen V. Hort", each occurrence, read -- Eugene V. Hort --.

Signed and sealed this 18th day of May 1965.

(SEAL)
Attest:

ERNEST W. SWIDER                                   EDWARD J. BRENNER
Attesting Officer                                         Commissioner of Patents